United States Patent [19]

Huff et al.

[11] Patent Number: 5,175,049
[45] Date of Patent: Dec. 29, 1992

[54] POLYOLEFIN LAMINATE CLING FILMS

[75] Inventors: Georgia M. Huff; Kaelyn C. Koch; Mark W. Murphy; Christopher J. Thomas, all of Lake Jackson, Tex.

[73] Assignee: The Dow Chemical Company, Midland, Mich.

[21] Appl. No.: 344,328

[22] Filed: Apr. 27, 1989

[51] Int. Cl.⁵ .................... B32B 27/32; C08L 23/04
[52] U.S. Cl. ............................. 428/218; 428/913; 428/349; 428/516; 204/165
[58] Field of Search ............ 428/516, 218, 332, 349

[56] References Cited

U.S. PATENT DOCUMENTS

| | | |
|---|---|---|
| Re. 32,325 | 1/1987 | Smith . |
| 3,682,767 | 8/1972 | Britton . |
| 3,995,007 | 11/1976 | Nakamura et al. . |
| 4,076,670 | 2/1978 | Godfrey . |
| 4,087,505 | 5/1978 | Sugimoto et al. . |
| 4,170,304 | 10/1979 | Huke .................. 206/597 |
| 4,222,913 | 9/1980 | Cooper . |
| 4,311,808 | 1/1982 | Su . |
| 4,327,009 | 4/1982 | Allen et al. . |
| 4,336,679 | 6/1982 | Lancaster et al. . |
| 4,337,188 | 6/1982 | Climenhage et al. . |
| 4,362,835 | 12/1982 | Phillips, Jr. . |
| 4,367,256 | 1/1983 | Biel . |
| 4,379,197 | 4/1983 | Cipriani et al. ............ 428/220 |
| 4,418,114 | 11/1983 | Briggs et al. . |
| 4,425,268 | 1/1984 | Cooper . |
| 4,436,788 | 3/1984 | Cooper .................. 428/483 |
| 4,542,188 | 9/1985 | van der Heijden . |
| 4,588,650 | 5/1986 | Mientus et al. . |

FOREIGN PATENT DOCUMENTS

| | | |
|---|---|---|
| 065359 | 4/1982 | European Pat. Off. . |
| 287272 | 4/1988 | European Pat. Off. . |

Primary Examiner—P. C. Sluby

[57] ABSTRACT

A wrap-packaging film having differential cling is provided by a film laminate, said film laminate comprising at least two layers, at least one of which layers is an outer reverse layer comprising a linear very low density ethylene copolymer (LVLDPE) having a critical density of less than about 0.915 g/cc which contains a tackifier in an amount sufficient to impart thereto an effective level of cling properties, at least one of which layers comprises an obverse layer of an olefin polymer or copolymer, such as a linear low density ethylene copolymer (LLDPE) which has a critical density of not less than 0.916 g/cc which has little or no cling, and wherein the difference in density between the reverse layer and the obverse layer is at least about 0.004 g/cc, the said differential cling properties being manifested in the higher level of cling of the LVLDPE reverse layer as compared to that of the obverse layer.

28 Claims, 2 Drawing Sheets 5,175,049

POLYOLEFIN LAMINATE CLING FILMS

FIELD OF THE INVENTION

Polyolefin laminate films having differential cling properties.

BACKGROUND OF THE INVENTION

In some wrap-packaging operations polymer films are desirably used which are self-sealing when portions are overlapped. Many self-sealing films (sometimes called "high-cling" films) have as much cling on one side as it does on the other, and this is often a detrimental feature. There are wrapping operations wherein a wrapping film is stretched tightly around an article or group of articles, and self-sealed in the stretched condition.

It has been known for many years that tackifiers can be added to a polymer to give the polymer the necessary tackiness or "cling" to adhere to itself, such as in U.S. Pat. No. 3,025,167, but such tackifiers, such as polybutene, terpene resin, hydrogenated rosin and rosin esters, create cling on both sides unless steps are taken to provide differential cling.

Polymeric films, e.g. polyolefin films, having one-sided cling properties are disclosed in U.S. Pat. 4,542,188. These involve the blending of a tackifier polymer, e.g. low molecular weight polybutene or atactic polypropylene (of less than 5000 molecular weight), with a "first" polymer and a "second" polymer, then extruding a film of the blended polymers at temperatures sufficient to maintain the blend as a liquid and cooling the extruded blend at rates sufficient to make a film having one side which has more cling than the opposite side. The patent discloses that preferably the "first" polymer is a low density polymer of ethylene, such as low density polyethylene (LDPE), and the "second" polymer is preferably a copolymer of ethylene and alpha-olefin of at least $C_3$. The polybutene preferably has a molecular weight of less than about 2000.

The use of high molecular wt. ethylene/vinyl acetate copolymer (containing 4-25% by wt. of the VA) blended with a linear copolymer of ethylene/higher alkene as a stretch wrap film is disclosed in U.S. Pat. No. 4,425,268. The patent also discloses that cling properties can be added to the stretch wrap film by adding a low molecular weight polyisobutene, a polyterpene, amorphous polypropylene or microcrystalline wax as a tackifier. The patent further discloses that other additives besides the tackifier may be added, such as fatty acid monoesters or an alkali metal stearate.

U.S. Pat. No. 4,327,009 and U.S. Pat. No. 4,415,691 disclose the high cling of films produced from LLDPE having densities "in the low range of about 0.90-0.93 gm/cc" and high block. They disclose a method for reducing block, but retaining high cling.

EPO Application 0.287.272 discloses a plastic cling film which comprises, inter alia, at least one layer which is a LLDPE polymer exhibiting cling on at least one surface which is attributed to a relatively high inherent level of n-hexane extractable material in the polymer. We have not, however, found the level of inherent n-hexane extractables to be the correlative or determinative factor in cling properties, but have found density levels and density differentials to be the determinative factor.

Various methods have been disclosed which seek to provide differential cling properties whereby one side of a wrap film exhibits desirably strong cling properties while the other side of the film exhibits little or no cling properties. In this disclosure, we refer to these type of films as having "differential cling". In a general sense, the methods for providing films having such differential cling properties have included the use of:

(1) film laminates of at least two different polymer layers, including co-extruded films, wherein one side of the film laminate has the desired cling properties, the cling layer sometimes containing a tackifier;

(2) surface treatment (e.g., chemical, thermal, and/or electrical, such as corona discharge) of films whereby cling properties are imparted to one side of the film; and (3) addition of tackifiers which are blended into the principle film polymer and the blend then extruded and cooled as a film in such a way as to cause the tackifiers to exhibit differential cling properties when applied as a wrap-packaging material.

It is the first method above, i.e. the addition of at least one tackifier to at least one of the polymers used in a film laminate structure, to which the present invention most closely pertains.

In this disclosure, the layer which comprises the outer "no-cling" layer of the laminate when applied as a packaging material is considered to be the "obverse" layer and the inner "high-cling" layer is the "reverse" layer. Ordinarily, it is the obverse layer which forms the exterior of a wrapped package or article, though there may be some instances wherein the high-cling "reverse" layer may be used as the outer layer, such as when there is some reason one would not want to use the high-cling layer in contact with the goods being wrapped. The "no cling" layer may actually exhibit a small amount of cling, according to the test procedure which is used in measuring the cling properties, but here it means that the amount of cling is insufficient to obtain a good self-seal when used in stretch-cling applications.

In this disclosure an "effective amount" of cling is that amount which is enough to provide the desired cling for the targeted application. It will be understood that some applications require more cling than other applications, and the present invention provides a means for regulating the amount of cling in the laminate by using pre-determined amounts of cling additives in the reverse layer, while holding the amount of cling in the obverse lager to significantly lower, acceptable levels or even to substantially no cling in the obverse layer.

SUMMARY OF THE INVENTION

The present invention comprises the preparation, composition, and use of a novel film laminate adapted for use as a packaging material having differential cling properties, said film laminate comprising at least two layers, at least one of which layers is a reverse layer comprising a high molecular weight linear very low density ethylene copolymer (LVLDPE) having a critical density of less than about 0.915 g/cc which contains a tackifier in an amount sufficient to impart thereto an effective level of cling properties, and at least one of which layers is an obverse layer comprising a high molecular weight ethylene homopolymer or copolymer (preferably LLDPE) which has a critical density of not less than 0.916 g/cc and which optionally contains an ingredient which behaves as tackifier by imparting a small amount of cling to the obverse layer.

and wherein it is critical that the difference between the density of the reverse layer and the density of the obverse layer is at least about 0.004 g/cc.

the said differential cling properties being manifested in the higher level of cling of the LVLDPE reverse layer as compared to that of the obverse layer.

The obverse layer will exhibit significantly less cling than the reverse layer, or even no cling, and may even exhibit slipperiness.

In accordance with the present invention laminates are prepared with differential cling which are especially useful, not only in wrapping of small articles (which may or may not undergo severe handling problems), but also the wrapping (e.g. stretch-wrapping, stretch-bundling, and tension-winding) of large articles, such as crates, palleted goods, bundles, and the like. The differential cling permits the stacking or other abutting of wrapped articles without having the obverse surfaces of the articles cling to each other sufficiently to cause tearing or other damage to the wrapping when the packages are separated from each other.

DETAILED DESCRIPTIONS, INCLUDING BEST MODE KNOWN

Figure 1:
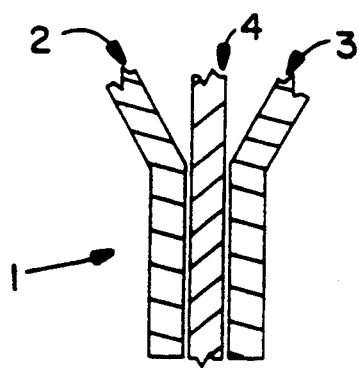
FIG. 1 is presented as a visual aid (not to scale) for relating the present novel laminate structures.

The amount of cling desired in the reverse layer, and the amount of no-cling desired in the obverse layer can vary over a fairly wide range, depending on the particular application as a self-sealing wrapping material. Some applications, such as large pallet wrappings, generally usually require a high or very high degree of cling, especially when the wrapping is stretched to high elongation. Some applications require only a modicum of cling, such as wrapping of small goods which are to be opened easily by the consumer. For purposes of description in this disclosure, we arbitrarily designate the following cling ranges, as measured by the test method described hereinafter:

| | |
|---|---|
| very low cling | 0 to 50 |
| low cling | 51 to 80 |
| medium cling | 81 to 170 |
| high cling | 171 to 250 |
| very high cling | above 250 |

The LVLDPE and LLDPE copolymers are known among practitioners of the linear ethylene polymer art. They are prepared using coordination metal catalysts, such as the Zeigler, or Natta, or Phillips type and are made by interpolymerizing a majority amount of ethylene with a minor amount of at least one copolymerizable alpha-alkene of $C_3$-$C_{12}$, preferably at least one of $C_4$14 $C_8$, most preferably $C_5$-$C_{12}$. Among the alpha-olefins (aka alpha-alkenes) such combinations as butene/octene, hexene/octene, or butene/hexene/octene may be used. Isomeric forms of the alkenes may be used as the alkene or as one of the alkenes, e.g., isobutene, isopentene, isohexene, isooctene, and the like.

It is well known in the copolymerization of ethylene with higher alpha-olefin comonomers, in producing linear copolymers of ethylene, that the greater the comonomer content along the copolymer chain, the lower the density. Also, the higher the molecular weight of the comonomer, the greater the effect on the density; i.e., a given amount of octene will lower the density more than if the same mole percentage amount of butene is used.

Except for the pendent alkyl side groups of the alpha-olefin comonomer in the copolymer chain (the side groups being that portion of the alpha-olefin which is not part of the carbon chain "backbone" itself), the chain is essentially linear, in contradistinction to the branched chains of polyethylene one obtains by polymerizing ethylene using a free-radical initiator in a high pressure reactor. In this disclosure, linear ethylene polymers made in an aliphatic solvent or aliphatic carrier are preferred over those made in a gas phase process.

When made by an interpolymerization process, the occurence of the higher alpha-olefin groups along the polymer chain is substantially random in the true sense of a comonomer, rather than concentrated at the ends of ethylene chains which is found when ethylene is polymerized in the presence of a telogen or other chain-stopper or chain-regulator. In contrast thereto, when using free-radical initiators, which uses high pressures and temperatures, attempts to copolymerize a higher alkene of $C_3$ or greater, especially $C_4$ or greater, meets with little formation of true random interpolymers because the higher alkene tends to function as a telogen and terminate the ethylene polymer chains, including side branch chains, rather than being randomly disposed along the chains The LVLDPE is preferably made using octene as the alpha-olefin comonomer, with enough of the octene being employed to bring the density of the copolymer into the critical range of about 0.915 to about 0.86 g/cc. Preferably the melt flow rate (MFR) as measured by ASTM D-1238 (190/2.16) is in the range of about 0.1 to about 25 gm/10 min., more preferably about 0.5 to about 15 gm/10 min., most preferably about 0.7 to about 10 gm/10 min. Other alpha-olefin comonomers used in amounts which produce interpolymers in the above density range and MFR range are operable, though are generally less preferred. The LVLDPE reverse layer preferably has a density of 0.912 g/cc or lower.

In this disclosure, any polymer having a MFR of not more than about 25 gm/10 min., when measured by ASTM D-1238 (190/2.16) is considered to be a high molecular weight polymer, though obviously the lower the MFR value of a given copolymer composition, the higher is the molecular weight of the polymer.

The LLDPE used as the obverse layer is preferably made using octene as the alpha-olefin comonomer, with enough of the alpha-olefin being employed to bring the density of the copolymer into the range of 0.916 g/cc and up to about 0.95 g/cc. Preferably the melt flow rate (MFR) as measured by ASTM D-1238 (190/2.16) is in the range of about 0.1 to about 25 gm/10 min., more preferably about 0.7 to about 10 min., most preferably about 0.7 to about 5 gm/10 min. Other ethylene polymers or ethylene copolymers having the above density ranges and MFR ranges can be used, but are generally not as preferred as the LLDPE. The density of the polymer used as the obverse layer preferably has a density of greater than 0.917 g/cc.

In processes in which the linear polymers are made, with resulting product properties largely dependent on the process conditions, presence of contaminants, and type of coordination metal catalyst employed, significant amounts of low molecular weight fractions are sometimes formed. These low molecular weight fractions are often referred to as "n-hexane extractables". Some polymers are manufactured which contain ingredients which are used to impart various properties to the polymer, such as processability, stress crack resistance, altered slip properties, altered block properties, antioxidants, compatibilizers, etc. Such ingredients may be "n-hexane extractable" and some may have an effect on the cling property of the polymer, either by increasing it or decreasing it.

In accordance with a preferred embodiment the laminate structure comprises at least one layer of LVLDPE having a critical density of about 0.915 g/cc or less as the reverse layer and at least one layer of LLDPE or another ethylene polymer or copolymer having a critical density of not less than 0.916 g/cc as the obverse layer; furthermore, it is critical that the difference between the density of the reverse layer and the density of the obverse layer is at least about 0.004 g/cc. The laminate may be prepared by co-extrusion (blown or cast) of the layers, whereby the layers become melt-bonded, or a molten layer of one can be extruded onto a frozen layer of the other, thereby effecting a bond between them; or a frozen layer of one and a frozen layer of the other can be pressed together by rollers and heated to effect a bond between them. Furthermore, layers of other materials can be sandwiched in the laminate as layers between the LVLDPE reverse layer and the obverse layer, whether the obverse layer is LLDPE or another ethylene polymer or ethylene copolymer. It is within the purview of the present disclosure that the laminate can comprise, for example, layers of LVLDPE/LLDPE/other ethylene polymer, LVLDPE/other ethylene polymer/LLDPE, or LVLDPE/other olefin polymer/LLDPE, where the other olefin polymer can be a $C_3$–$C_8$ alpha-olefin. Other combinations of layers can be used without departing from the present invention of using a laminate comprising a reverse layer having a density of about 0.915 g.cc or less and an obverse layer having a density of not less than 0.916 g/cc, and a density difference of at least about 0.004 g/cc (preferably at about 0.005 g/cc or more).

The tackifier which one may use in providing beneficial cling properties to the laminate structure may be at least one of the low molecular weight $C_3$–$C_6$ polyolefins, such as polypropylene, polybutene, polyisobutene, polyhexene, preferably polybutene or polyisobutene, or mixtures of these. It may also be a low molecular weight copolymer of the $C_2$–$C_6$ olefins, such as ethylene/methacrylic acid copolymers, ethylene/acrylic acid copolymers, ethylene/vinyl alkylate copolymers, ethylene/alkyl acrylate copolymers, and the like, so long as they are used in amounts which are either compatible with the PE, or can be compatibilized by way of a compatibilizing agent and which impart a beneficial amount of the cling properties desired. By the expression "low molecular weight" it is meant that the molecules of the tackifier are sufficiently small to be able to manifest themselves on the surface of the laminate structure whereby the desired cling properties are achieved. These "low molecular weight" polymers have a MFR which is much too high to be measured by the "standard" ASTM D-1238 test conditions of 190° C./2.16 kg and usually have to be measured at either much lower temperatures or much smaller weights, or both, such as 125° C./0.325 kg or lower. One manner in which the tackifier may manifest cling properties on the surface of the polymer is by migration to the surface of the polymer (containing the tackifier dispersed therein) as the polymer is cooled after being melt-blown, melt-cast, or otherwise formed into a film. It is possible in some cases for the tackifier to migrate to the surface of the polymer film for an appreciable period of time after the film has been cooled and stored.

It has also been found that tackifier added to the LVLDPE portion of a LVLDPE/LLDPE laminate structure can "bleed" to some extent into the higher density LLDPE and impart a limited amount of cling to the obverse surface of the LLDPE layer. Thus, the LLDPE layer of the laminate can contain some tackifier by that means, or by having it added, as well as having some inherent amount of cling, as slight as it may be, by way of having low molecular weight fractions, such as those which are subject to n-hexane extraction. The same "bleeding" from the LVLDPE layer into the obverse layer can occur with many other olefin polymers or copolymers. Having a modicum of cling on the obverse surface is often beneficial when it is desired to have the reverse surface cling to the obverse surface; yet by having only limited cling properties in the obverse surface, many handling and storage procedures are made easier.

The test method for determining n-hexane extractables is one recommended by the FDA for determining suitability of the polymer for use in contact with ingestable products. The recommended FDA test method is published as CFR 177.1520(c)

The method of dispersing the tackifier in the linear copolymer may be by any convenient method which provides substantially uniform disperions. One method is to physically mix the tackifier with solid particles of the linear copolymer in a tumbling device, or other suitable device, then put the mixture through a mixer-extruder at temperatures sufficient to at least soften the copolymer, if not to melt it; this is a convenient method for making a masterbatch (concentrate) for subsequent mixing into polymers at desired levels. Highshear mixers sometimes create enough shear-heat to substantially soften or melt the polymer. Also, if the tackifier is a liquid, or becomes liquified when heated during the mixing operation, it may be injected into polymer in a mixing device (e.g., an extruder), or in some cases, it may have a tendency to behave somewhat like a solvent and actually cause the polymer to soften at a lower temperature than it normally would; in this way the tackifier can assist itself in becoming uniformly dispersed in the polymer.

FIG. 1 provides an illustration, not drawn to any scale, of a cross-sectional view of a portion of an embodiment as a visual aid for relating the invention. There the generally-depicted laminate structure (1) comprises the LVLDPE reverse layer (2) which is shown partially peeled-back for ease of description, the obverse layer (3) which is also shown partially peeled-back for the same purpose, and an optional layer (4) between the LVLDPE and obverse layers which may be used at times to impart certain properties such as color, opaqueness, vapor-impermeability, aesthetics, RF-sealability, static dissipation, UV light blockage, film-building, or for other reasons. The optional layers may be, for example, another layer of ethylene polymer, a vinyl polymer layer, an acrylic polymer layer, a thin paper layer, a thin metal foil or mesh, a thin fabric, an RF-responsive ethylene/carbon monoxide copolymer or terpolymer. By the word "thin", as used supra, it is meant that the optional layer is not so thick that it prevents easy folding and/or overlapping of the present laminate in order to utilize the self-sealing properties of the laminate. Ordinarily, the total thickness of the laminate is in the range of 0.2 mils (0.00051 mm) to 6 mils (0.1524 mm), depending on the particular application. When used as a stretching film, it is not unusual for a film to be stretched, at least in part, to less than one-half its original thickness. In some of the applications where only small items are to be wrapped, such as is done in some households, there may be little or no stretching involved and often only a modicum of cling is needed for such applications: here a very thin film laminate can be used, such as films of 0.2 mils or less. In the absence of the optional layer (4) the two-layer laminate is, nevertheless, widely useful as a laminate having differential cling properties.

Figure 2:
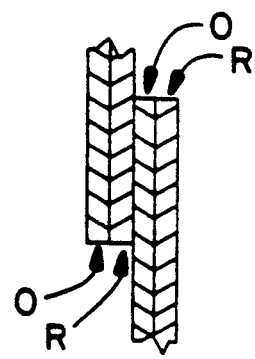
FIG. 2 is presented as a visual aid (not to scale) for illustrating an embodiment of an obverse-to-reverse cling.

FIG. 2 is an illustration, not to scale, for use as a visual aid in relating cling in an overlap of the obverse layer (0) with the reverse layer (R).

Figure 3:
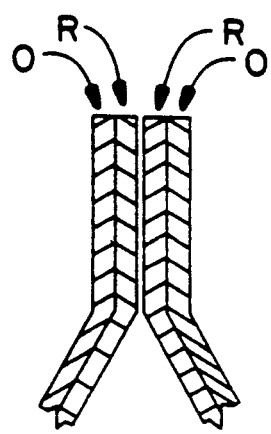
FIG. 3 is presented as a visual aid (not to scale) for illustrating an embodiment of a reverse-to-reverse cling.

FIG. 3 is an illustration, not to scale, for use as a visual aid in relating cling in an embodiment wherein the reverse layer (R) of a film portion clings to the reverse layer (R) of another portion of film, with 0 representing the obverse layer.

Figure 4:
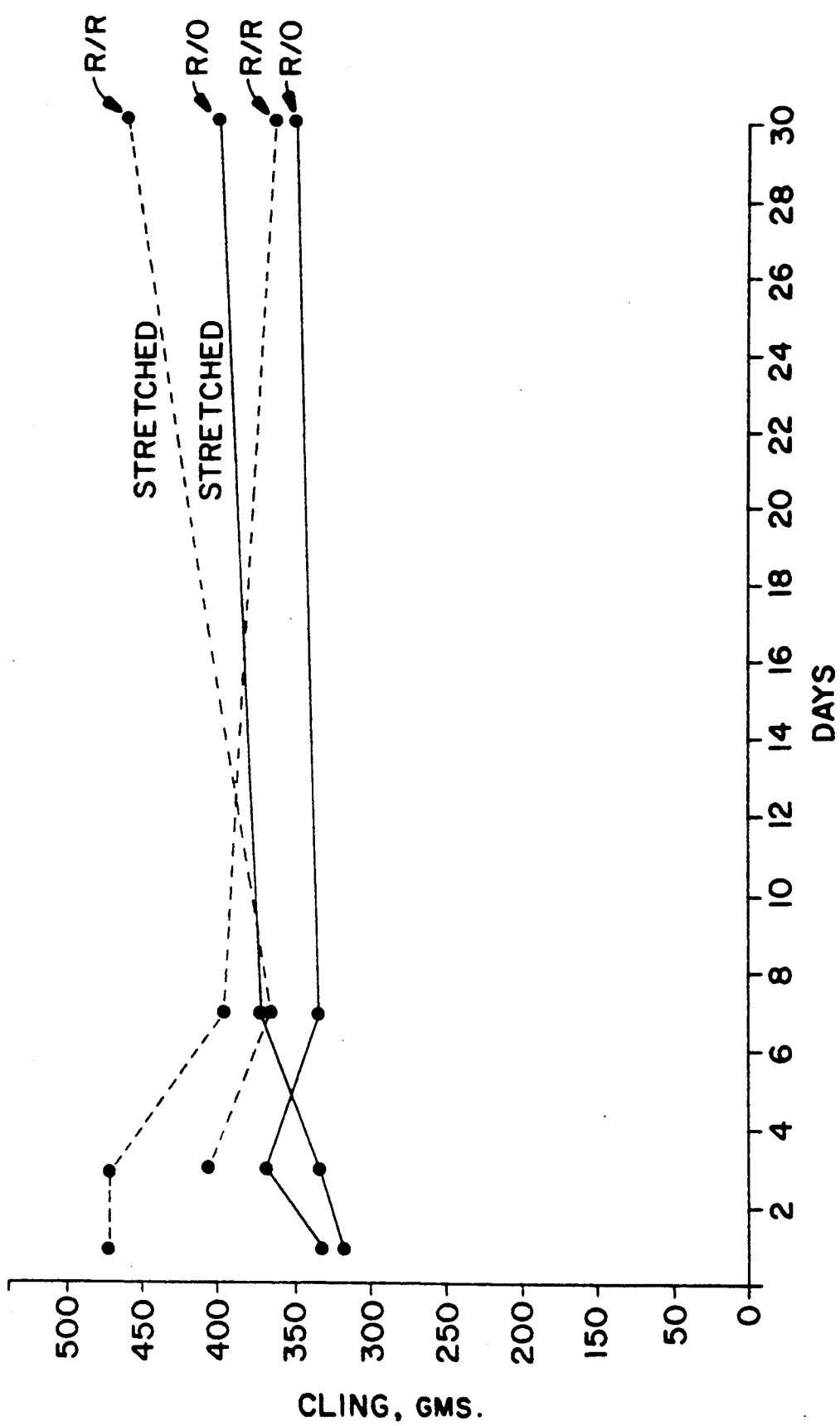
FIG. 4 is a graph for relating certain data from Example 4 of this disclosure.

FIG. 4 is a graph using data selected from Example 4.

The following examples are provided to demonstrate cling properties of films which can be used in some of the embodiments of the present invention, and to provide some examples for comparison purposes, but the invention is not limited to laminates containing these particular embodiments. In the following examples, melt flow rate (MFR) is measured in accordance with ASTM D-1238 (190° C./2.17 kg) unless noted otherwise.

EXAMPLE 1

(comparison tests using monolayer films)

Blown monolayer films are fabricated on a 2" extruder under typical conditions. The films are varied as to density of the base PE and the polybutene mol. wt. and concentration. The films are tested for cling according to ASTM-4649A-3 at various time intervals. The cling recorded in Table 1 is that measured after equilibrium is reached. In some cases the cling of the PE polymer, with and/or without the cling additive, is measured to compare with cling of one exposed surface of the simulated laminate with the other exposed surface of the simulated laminate and in other cases to compare the cling of the sample to itself.

In the following Table I:

PE-1 is LVLDPE, 1-octene comonomer, density 0.912 g/cc, MFR of 1 g/10 min.

PE-2 is LLDPE, 1-octene comonomer, density 0.920 g/cc, MFR of 1 g/10 min.

PE-3 is LLDPE, 1-octene comonomer, density of 0.926 g/cc, MFR of 1 g/10 min.

In Table 1 "300" means 1.5% of PB-300 is added to the polymer. PB-300 is a commercially-available polybutene having a nominal molecular weight of about 1350.

In Table 1 "1500" means 1.5% of PB-1500 is added to the polymer. PB-1500 is a commercially-available polybutene having a nominal molecular weight of about 2100.

TABLE I

| Simulated Laminate Structures | | | | |
|---|---|---|---|---|
| | | \multicolumn{3}{c}{Cling, in Grams} | | |
| Laminate Structure | | Reverse to Obverse | Reverse to Reverse | Obverse to Obverse |
| Reverse Layer | Obverse Layer | | | |
| PE-1/300 | PE-2 | 117 | 225 | 5 |
| Ditto | PE-3 | 120 | 225 | 5 |
| Ditto | PE-2/300 | 165 | 225 | 30 |
| Ditto | PE-3/300 | 163 | 225 | 50 |
| Ditto | PE-3/1500 | 120 | 225 | 5 |
| PE-1/1500 | PE-2 | 115 | 265 | 5 |
| Ditto | PE-3 | 100 | 265 | 5 |
| Ditto | PE-2/300 | 175 | 265 | 30 |
| Ditto | PE-3/300 | 200 | 265 | 50 |

EXAMPLE 2

A factorial designed experiment is developed to examine the relationships between percentage of low mol. wt. polybutene (2100 mol. wt.) and LVLDPE (1-octene comonomer). See Table 2 below.

TABLE 2

| Designed Experiment For One-sided Cling | | | | | | |
|---|---|---|---|---|---|---|
| Sample | % PB-A | % PB-B | LVLDPE Density-A | LLDPE Density-B | MFR g/10 min A | B |
| 1 | 1.5 | 0 | 0.905 | 0.917 | 4.5 | 2.3 |
| 2 | 1.5 | 1.5 | 0.912 | 0.926 | 3.3 | 2.0 |
| 3 | 1.5 | 0 | 0.912 | 0.926 | 3.3 | 2.0 |
| 4 | 1.5 | 1.5 | 0.905 | 0.926 | 4.5 | 2.0 |
| 5 | 1.5 | 0 | 0.912 | 0.917 | 3.3 | 2.3 |

Two-layer cast coextruded structures comprising Layer A (LVLDPE), containing 1.5 or 4% PB, and Layer B (LLDPE), containing 0 or 1.5% PB, are tested for cling according to ASTM-4649A-3 at one day, three day, seven day, and one month time intervals. The samples on which the best results are achieved are shown in Table 2 above, with the cling measurements shown in Table 3 below.

TABLE 3

| | Grams of Cling After | | | | Stretch |
|---|---|---|---|---|---|
| | 1 Day | 3 Days | 7 Days | 31 Days | 200%* |
| Sample 1. | | | | | |
| Cling/no cling | 223 | 295 | 322 | 352 | 285 |
| No cling/no cling | 75 | 112 | 142 | 115 | 65 |
| Sample 2. | | | | | |
| Cling/no cling | 215 | 228 | 265 | 395 | 230 |
| No cling/no cling | 55 | 58 | 58 | 60 | 73 |
| Sample 3. | | | | | |
| Cling/no cling | 175 | 203 | 233 | 313 | 213 |
| No cling/no cling | 53 | 60 | 73 | 98 | 77 |
| Sample 4. | | | | | |
| Cling/no cling | 328 | 338 | 348 | 357 | 345 |
| No cling/no cling | 42 | 52 | 73 | 208 | 78 |
| Sample 5. | | | | | |
| Cling/no cling | 193 | 258 | 280 | 227 | 167 |
| No cling/no cling | 58 | 73 | 107 | 78 | 65 |

(*After the 31 day test, film was stretched 200% and cling re-measured)

EXAMPLE 4

A cast coextruded structure (2-mil film) consisting of 25% by wt. of LLDPE (2.5 MFR, 0.935 dens.) as the obverse (no cling) layer and 75% by wt. of LVLDPE (4 MFR, 0.904 dens.) containing 1.5% PB-300 (1350 mol. wt.) as the reverse (cling) layer is fabricated under standard conditions. Cling is measured after 1, 3, 7, and 30 days. There is no measurable cling (and low coefficients of friction) between obverse-to-obverse surfaces, but there are very high levels of cling (above 300 gms) between reverse-to-reverse and reverse-to-obverse surfaces (both stretched and unstretched). The cling data in Table 4 below are graphed in FIG. 4 where the cling-/no cling (reverse-to-obverse, R/O) measurements are represented by the solid line and the cling/cling (reverse-to-reverse, R/R) measurements are represented by the dotted line.

TABLE 4

| | Cling, in Grams | | | | |
|---|---|---|---|---|---|
| | Reverse/ Obverse | | Reverse/Reverse | | Coef. of Friction |
| Days | unstrch | strchd | unstrch | strchd | Obverse/Obverse |
| 1 | 332 | 317 | 472 | — | 0.4 |
| 3 | 367 | 332 | 472 | 412 | 0.4 |
| 7 | 335 | 373 | 398 | 370 | 0.4 |
| 30 | 352 | 403 | 362 | 467 | 0.45 |

EXAMPLE 5

A cast coextruded laminate is prepared using LVLDPE (density 0.905 g/cc and MFR of 4) having a sufficiently low density to impart at least a modicum of cling, as the reverse layer, and using LLDPE (density 0.935 g/cc and MFR of 25) having virtually no cling as the obverse layer. The laminate is about 2 mils thick, of which the weight ratio of the reverse layer to the obverse layer is about 75/25. The following cling measurements are obtained: reverse to reverse:174; obverse to obverse:0; reverse to obverse:122.

The laminate is useful in wrapping packages which are intended to be easily opened by the consumer, yet exhibits little or no tendency to cling to other abutting packages, such as when stacked next to each other or one on top of another.

EXAMPLE 6

Four 2-layer laminated structures are prepared by cast coextruding a tackified reverse layer to a nontackified obverse layer. The tackifier is a low molecular weight polybutene (PB) (2100 mol. wt.), the reverse layer is a LVLDPE, and obverse layer is a LLDPE. The weight ratio of reverse/obverse layers is 75/25. The tackifier is then allowed to diffuse throughout the structure until equilibrium is essentially reached at ambient laboratory conditions. The samples are as outlined below in Table 5 and the 7-day cling data are in Table 6.

TABLE 5

| | Laminate Layers | | |
|---|---|---|---|
| Sample | Reverse, Dens. | Reverse, % PB | Obverse, Dens. |
| 1 | 0.905 | 0.5 | 0.935 |
| 2 | 0.905 | 1.0 | 0.935 |
| 3 | 0.912 | 0.5 | 0.935 |
| 4 | 0.912 | 1.0 | 0.935 |

TABLE 6

| | Cling, in Grams as Measured by ASTM D-4649 | | |
|---|---|---|---|
| Sample | Rev./Obv. | Rev./Obv. 200% Stretched | Obv./Obv. |
| 1 | 137 | 108 | 0 |
| 2 | 203 | 128 | 0 |
| 3 | 113 | 72 | 0 |
| 4 | 152 | 87 | 0 |

EXAMPLE 7

A bundle of 50 lb. bags of resin pellets is stretch-wrapped using a 0.8 mil blown film laminate having a cling layer of LVLDPE (1 MFR, 0.905 dens.), containing a small amount of low mol. wt. polybutene as a tackifier, and a no-cling layer of LLDPE (1 MFR, 0.935 dens.). The wrapping process uses the no-cling layer as the outside surface of the bundle, and the cling layer is overlapped and brought into good contact with the no-cling layer. The stretch-wrapped bundle is found to have sufficient seal strength (cling) to survive being transported on a fork-lift pallet and then on an open-bed truck without failure of the wrapping.

The examples above are provided for illustration purposes, but the invention is not limited to the particular embodiments shown in the examples.

Combinations of cling/no-cling polymers other than the ones illustrated above can be prepared in accordance with the present disclosure without departing from the invention in the claims that follow.

What is claimed is:

1. A multiple layer film laminate which is useful as a cling-wrap packaging material, said film laminate comprising
   an obverse layer and a reverse layer having differential cling properties and a density difference of at least about 0.004 g/cc,
   the obverse layer comprising an olefin polymer without a tackifier, the olefin polymer having a density of at least 0.916 g/cc, and
   the reverse layer comprising an ultra low density ethylene copolymer and tackifier, the ultra low density copolymer having a density of less than 0.916 g/cc.

2. The laminate of claim 1 wherein the linear very low density polyethylene has a MFR in the range of about 0.1 g/10 min. to about 25 g/10 min, and the obverse layer has a MRF in the range of about 0.1 g/10 min. to about 25 g/ 10 min.

3. The laminate of claim 1 wherein the linear very low density polyethylene comprises ethylene interpolymerized with at least one alpha-olefin of the group consisting of octene, hexene, butene, and 4-methylpentene.

4. The laminate of claim 1 wherein the linear very low density polyethylene comprises ethylene interpolymerized with octene.

5. The laminate of claim 1 wherein the linear very low density polyethylene comprises ethylene interpolymerized with octene and at least one of hexene and butene.

6. The laminate of claim 1 wherein the linear very low density polyethylene has blended therein a small but minor amount of at least one other high molecular weight polyolefin.

7. The laminate of claim 1 wherein the obverse layer is a linear low density polyethylene comprising an interpolymer of ethylene and at least one $C_3$-$C_{12}$ alpha-olefin.

8. The laminate of claim 1 wherein the obverse layer is a linear low density polyethylene comprising an interpolymer of ethylene and octene.

9. The laminate of claim 1 wherein the reverse layer has a density of 0.912 g/cc or less.

10. The laminate of claim 1 wherein the obverse layer has a density of 0.917 g/cc or more.

11. The laminate of claim 1 wherein the reverse linear very low density polyethylene layer and the obverse layer each comprise an ethylene/1-octene/alpha-olefin terpolymer wherein the alpha-olefin is a $C_3$-$C_6$.

12. The laminate of claim 1 wherein the tackifier comprises a low molecular weight polymer as an additive.

13. The laminate of claim 1 wherein the tackifier comprises n-hexane extractable low molecular weight polymeric material.

14. The laminate of claim 1 wherein the tackifier comprises a low molecular weight $C_2$-$C_{12}$ polyolefin as an additive in amounts which provide effective cling.

15. The laminate of claim 1 wherein the tackifier comprises at least one of the low molecular weight $C_3$-$C_6$ polyolefins of the group consisting of polypropylene, polybutene, polypentene, polyhexene, isomers of these, and mixtures of these.

16. The laminate of claim 1 wherein the tackifier is present in the linear very low density polyethylene in an amount in the range of from about 0.01% to about a3% by wt.

17. The laminate of claim 1 wherein the tackifier is low molecular weight polybutene or polyisobutene.

18. The laminate of claim 1 wherein the obverse layer and reverse layers are the outside layers of a laminate comprising at least 3 layers.

19. The laminate of claim 1 wherein the thickness of the laminate is in the range of about 0.02 to about 6 mils.

20. In a laminated film comprising at least two layers, said film being adapted for use as a cling-wrap packaging material wherein one of the outer layers has greater cling than the other outer layer, the embodiment wherein the outer layer having the greater cling comprises linear very low density polyethylene having a density of less than about 0.915 g/cc and having a MFR in the range of about 0.01 to about 25 g/10 min., wherein the other outer layer of lesser cling comprises a polymer having a density of not less than 0.916 and a MFR in the range of about 0.01 to about 25 g/10 min., and wherein there is a difference in density between the outer layers of at least about 0.004 g/cc.

21. The film laminate defined by claim 1 wherein the olefin polymer in the obverse layer is a linear low density polyethylene.

22. The film laminate defined by claim 21 wherein the linear low density polyolefin in an interpolymer of ethylene and butene-1, hexene-1, octene-1 and/ or 4-methyl-1-pentene.

23. The film laminate defined by claim 1 wherein the tackifier is a low molecular weight polyolefin.

24. The film laminate defined by claim 1 additionally comprising at least one polyolefin film layer as a core layer between the reverse layer and the obverse layer.

25. The cling-wrapped package comprising an article cling-wrapped in the film laminate defined by claim 1.

26. The film laminate defined by claim 1 wherein said tackifier is included in amounts of up to about 1.5 percent.

27. A multiple layer film laminate which is useful as a cling-wrap packaging material, said film laminate comprising an obverse layer and a reverse layer having differential cling properties and a density difference of at least about 0.004 g/cc, the obverse layer comprising a linear low density polyethylene without a tackifier, the linear low density polyethylene having a density of at least 0.916 g/cc, and the reverse layer comprising an ultra low density ethylene copolymer and a polybutene or polyisobutene tackifier, the ultra low density copolymer having a density of less than 0.916 g/cc.

28. The film laminate defined by claim 27, wherein said tackifier is included in amounts of up to about 1.5 percent.

* * * * *